D. N. LUSE.
CHECK ROWER STAKE.
APPLICATION FILED JAN. 31, 1914.
1,113,800.
Patented Oct. 13, 1914.
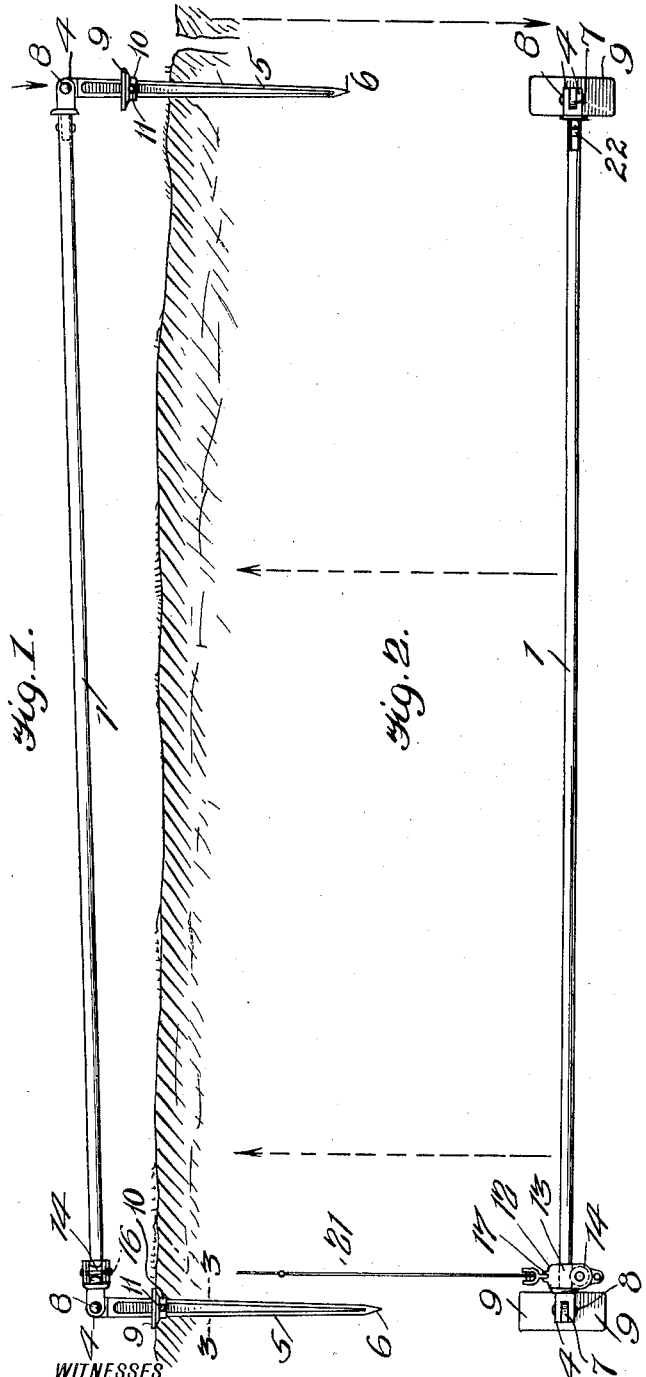
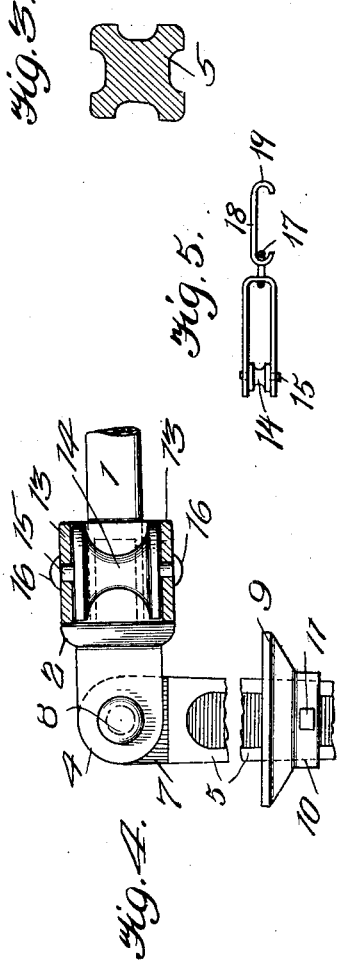
WITNESSES
INVENTOR
DAVID N. LUSE,
BY
ATTORNEYS

UNITED STATES PATENT OFFICE.

DAVID NEWMYRE LUSE, OF ROCKWELL CITY, IOWA.

CHECK-ROWER STAKE.

1,113,800.  Specification of Letters Patent.  Patented Oct. 13, 1914.

Application filed January 31, 1914. Serial No. 815,749.

*To all whom it may concern:*

Be it known that I, DAVID N. LUSE, a citizen of the United States, and a resident of Rockwell City, in the county of Calhoun and State of Iowa, have invented a new and useful improvement in Check-Rower Stakes, of which the following is a specification.

My invention is an improvement in check-rower stakes, and has for its object to provide a stake of the character specified, for supporting the end of a check wire, and wherein means is provided for engagement by the checkwire, and other means for supporting the said engaging means for movement laterally with respect to the wire.

In the drawings:—Figure 1 is a side view of the improved stake, Fig. 2 is a top plan view, Fig. 3 is a section on the line 3—3 of Fig. 1, Fig. 4 is an enlarged detail of one end of the stake, with parts in section, and Fig. 5 is a side view of the hook.

The present embodiment of the invention comprises a rod 1 provided at each end with a head 2, which forms a stop at each end of the rod, and each head is provided with parallel laterally spaced ears or bearing lugs 4. A stake 5 is connected with each end of the rod, each of the stakes being of the cross section shown in Fig. 3 and having its lower end pointed as indicated at 6. The upper end of each stake is provided with a bearing lug 7, which is received between the lugs 4 on the adjacent head of the rod, and a pivot pin or rivet 8 is passed through registering openings in the lugs to pivotally connect the stakes with the rod. A plate 9 is connected with each stake, each plate having a central bearing 10 for engaging the stake, and the plate is secured to the stake by means of a cross pin 11. Each of the plates 9 extends on opposite sides of the stake and the said plates are adapted for engagement by the foot or feet of the operator to force the stakes into the ground. A sliding member is connected with the rod, being in the form of a stirrup comprising a body 12 and arms 13. The arms 13 of the stirrup embrace the rod, extending on opposite faces thereof, and a pulley or wheel 14 is journaled between the arms of the stirrup on the opposite side of the rod from the body. The wheel 14, is annularly grooved to fit the rod as shown, and is mounted upon a journal pin 15, which passes through the wheel and through openings in the arms of the stirrup, and the ends of the pin are headed as shown at 16. The body of the stirrup is provided with a perforated swivel lug 17, for engagement by an eye on the body 18 of the yoke, whose arms 19 are hooks for engagement by a check knot at the end of the check wire 21. The head 2 of each end of the rod 1 is connected to the rod by means of a tenon 22, which enters the bore of the rod, the rod being preferably tubular, as shown. The head is secured to the rod by means of a rivet or the like, and the ends of the rivet are countersunk flush with the peripheral surface of the rod.

As is known, check wires are used to operate trip mechanism on planters, as for instance, corn planters, the wire having knots or enlargements at regular intervals for operating the trip mechanism. In order that the grain be dropped at regular intervals so that the plants are in proper transverse alinement, the check wire must be evenly tensioned.

In use, the one stake is first forced into the ground by placing the foot on the plate 9. This plate acts as a stop for engagement by the foot and as a brace for similar engagement to prevent lateral movement of the stake during the tightening of the check wire. The pipe or rod 1, during the placing of the first stake is in vertical position, being in alinement with the stake, and thus provides a powerful leverage for tightening the check wire. As soon as the first stake has been placed and properly set, the pipe or rod 1 is swung to the right, and the second stake is similarly placed, being forced into the ground by the foot or feet of the operator engaging the plate 9. The pipe or rod 1 is now securely held, and the wire may be held taut during the placing of the first stake, by means of the pipe or rod. The hinge joint between the pipe or rod and the stakes is so arranged that the pipe or rod cannot swing forwardly but must swing laterally, and the head 2 is of sufficient size to prevent the stirrup or pulley from passing over the stake. The first stake as shown at the left of Fig. 1, is inserted to a depth such that the plate 9 engages the surface of the ground. The second stake at the right of the said figure is not set so deep, the arrangement being such that the rod or pipe extends upwardly toward the said second stake, and the said second stake is just deep enough to provide uniform tension of the check wire as the planter returns.

It will be noticed from an inspection of Fig. 2 that dotted lines are provided, showing the planted rows. The first two dotted lines at the left of the figure represent the first two rows made by the planter as it leaves the rod or pipe, and the check wire 21 adjacent to the said row is in practice about eight inches from the row and to the left thereof, when the field is to the right as shown in Fig. 2. A planter works either to left or right. The dotted line to the right of the pipe or rod represents the inner row made by the planter as it returns, and the pulley supporting the check wire at the left of Fig. 2 will move toward the right of the said figure as the planter returns, the pulley running on the pipe or rod to the extreme right end.

In practice, the pipe or rod 1 is about six feet in length or nearly twice the width of the planter. The pulley is swiveled to the yoke 18 as shown. After the planter has traveled across the field, the holder at that end of the field is reset, the resetting being done after the planter has been turned for the return. When the planter reaches its starting point, the holder at that end is reset. Thus it will be seen that whenever the planter reaches the end of the wire, the holder at that end is reset, and this takes place at the completion of every row. It will be understood that the planter plants two rows at each trip.

In the ordinary manner of setting the check wires, the stake holding the end from which the planter starts, is set at about the center of the planter and on starting the wire is very tight, since it must be tight to furnish any tension arranged as above specified. After the planter has traveled a short distance the wire is much looser, and on every trip of the planter the same difficulty arises. With the present arrangement, however, the wire is free to move laterally to provide a uniform tension from one end of the field to the other.

I claim:—

1. A device of the character specified, comprising a rod provided at each end with a head and having an annular shoulder or stop between each head and the pipe or rod, each head having spaced bearing lugs extending longitudinally of the rod, a stake for each end of the rod, each stake having one end pointed and having at the other end a bearing lug fitting between the adjacent lugs of the rod, a pivotal connection between the lugs at each end of the rod, a foot plate for each stake, each foot plate having a bearing through which the stake is passed, a pin rigidly connecting each plate to the stake, a stirrup on the rod, the body of the stirrup having a perforated lug, a roller journaled between the arms of the stirrup on the opposite side of the rod from the lug, and a yoke for connection with the stirrup, the yoke comprising a body having a hook for engaging the adjacent lug and arms each having a hook for engagement by the check wire.

2. A device of the character specified, comprising a rod provided at each end with a head and with a pair of longitudinally extending laterally spaced bearing lugs on the outer side of each head, a stake at each end of the rod, each stake having a lug received between the adjacent pair of lugs and pivoted thereto, a foot plate arranged transversely of each stake near the upper end thereof, a stirrup in connection with the rod and adapted for detachable connection with one end of a check wire, the stirrup comprising a body and arms extending on opposite sides of the rod, and a roller shaped to fit the rod journaled between the arms on the opposite side of the rod from the body.

DAVID NEWMYRE LUSE.

Witnesses:
F. P. Huff,
W. A. Sandbury.

---

Copies of this patent may be obtained for five cents each, by addressing the "Commissioner of Patents, Washington, D. C."